(12) United States Patent
Lee

(10) Patent No.: US 7,374,401 B2
(45) Date of Patent: May 20, 2008

(54) BELL-SHAPED FAN COOLING HOLES FOR TURBINE AIRFOIL

(75) Inventor: Ching-Pang Lee, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 260 days.

(21) Appl. No.: 11/069,869

(22) Filed: Mar. 1, 2005

(65) Prior Publication Data

US 2008/0031738 A1  Feb. 7, 2008

(51) Int. Cl.
*F01D 5/18* (2006.01)

(52) U.S. Cl. .................... 416/97 R; 415/115
(58) Field of Classification Search ............. 415/115; 416/97 R
See application file for complete search history.

(56) References Cited

U.S. PATENT DOCUMENTS

| 4,650,949 | A | | 3/1987 | Field |
| 4,664,597 | A | | 5/1987 | Auxier et al. |
| 4,684,323 | A | * | 8/1987 | Field ..................... 416/97 R |
| 4,922,076 | A | | 5/1990 | Cross et al. |
| 5,486,093 | A | | 1/1996 | Auxier et al. |
| 5,609,779 | A | * | 3/1997 | Crow et al. ............ 219/121.71 |
| 5,683,600 | A | | 11/1997 | Kelley et al. |
| 6,283,199 | B1 | | 9/2001 | Nakamura et al. |
| 6,287,075 | B1 | | 9/2001 | Kercher |
| 6,368,060 | B1 | * | 4/2002 | Fehrenbach et al. ...... 416/97 R |

* cited by examiner

*Primary Examiner*—Ninh H. Nguyen
*Assistant Examiner*—Devin Hanan
(74) *Attorney, Agent, or Firm*—Adams Evans P.A.; William Scott Andes

(57) ABSTRACT

A turbine airfoil a plurality of cooling holes formed in the external surface of the airfoil in fluid communication with a cooling circuit. The cooling holes have a metering section and a diffuser section opening to the external surface of the airfoil. The diffuser section has top, bottom and opposed side walls, where at least the opposed side walls and one or the other of the top and bottom walls of the diffuser section have a downstream diverging, bell-shaped configuration for achieving a flow of the cooling film from the cooling circuit with enhanced spread, enhanced attachment and less turbulence to a downstream surface of the airfoil local to each respective cooling hole.

16 Claims, 9 Drawing Sheets

BELL-SHAPED FAN COOLING HOLES FOR TURBINE AIRFOIL

TECHNICAL FIELD AND BACKGROUND OF THE INVENTION

This invention relates to a turbine airfoil that includes high efficiency, bell-shaped cooling holes. The bell-shaped holes are best suited for use on the suction side of the airfoil and the flat wall portion of the pressure side near the trailing edge. In a gas turbine engine, air is compressed in a compressor, mixed with fuel and ignited in a combustor for generating hot combustion gases which flow downstream through one or more stages of turbine nozzles and blades. The nozzles include stationary vanes followed in turn by a corresponding row of turbine rotor blades attached to the perimeter of a rotating disk. The vanes and blades have correspondingly configured airfoils which are hollow and include various cooling circuits and features which receive a portion of air bled from the compressor for providing cooling against the heat from the combustion gases.

The turbine vane and blade cooling art discloses various configurations for enhancing cooling and reducing the required amount of cooling air in order to increase the overall efficiency of the engine while obtaining a suitable useful life for the vanes and blades. For example, typical vane and blade airfoils in the high pressure turbine section of the engine include cooling holes that extend through the pressure side, or suction side, or both, for discharging a film of cooling air along the outer surface of the airfoil to effect film cooling in a conventional manner.

A typical film cooling hole is in the form of a cylindrical aperture inclined axially through one of the airfoil sides, such as the pressure side, for discharging a film of air in the aft direction. The cooling holes are typically provided in a radial or spanwise row of holes at a specific pitch spacing. In this way, the cooling holes discharge a cooling film that forms an air blanket for protecting the outer surface of the airfoil from hot combustion gases during operation.

In the region of the blade leading edge, it is also known to incline the cylindrical film cooling holes at an acute span angle to position the hole outlets radially above the hole inlets and discharge the cooling film radially outwardly from the respective holes. In order to improve the performance of cooling holes, it is also conventional to modify their shape to effect cooling flow diffusion. The diffusion reduces the discharge velocity and increases the static pressure of the airflow. Diffusion cooling holes are found in patented configurations for improving film cooling effectiveness with suitable blowing ratios and backflow margin. A typical diffusion film cooling hole may be conical from inlet to outlet with a suitable increasing area ratio for effecting diffusion without undesirable flow separation. Diffusion occurs in three axes, i.e. along the length of the hole and in two in-plane perpendicular orthogonal axes. See, for example, U.S. Pat. No. 6,287,075 to the present assignee.

Other types of diffusion cooling holes are also found in the prior art including various rectangular-shaped holes, and holes having one or more squared sides in order to provide varying performance characteristics. Like conical diffusion holes, the rectangular diffusion holes also effect diffusion in three dimensions as the cooling air flows therethrough and is discharged along the outer surface of the airfoil. See, for example, U.S. Pat. Nos. 6,283,199, 5,683,600 and 5,486,093.

As indicated above, the various diffusion cooling holes are typically arranged in rows extending along the span or radial axis of the airfoil, and are positioned as closely together as space permits for collectively discharging film cooling air. Since adequate spacing must be provided between the adjacent cooling holes for maintaining suitable strength, the discharge film cooling air does not provide 100% coverage along the span line of the corresponding row of holes.

A typical prior art hole pitch spacing is ten diameters of the circular hole inlet. In the example of the spanwise inclined cylindrical cooling holes described above, a typical span angle is about 30 degrees, with a 0.25 mm hole diameter. The effective coverage of the row of fan cooling holes may be defined by a coverage parameter represented by the span height of the cooling hole along the airfoil outer surface divided by the pitch spacing of adjacent holes. For an inclined cylindrical hole, the outer surface span height of the hole may be the diameter of the hole divided by the sine of the inclination angle. This results in a 20% coverage value for 30 degree inclined cylindrical holes at a ten diameter spacing.

This coverage is significantly improved by the use of conical diffusion holes. A typical prior art airfoil may have 0.25 mm circular inlets increasing in area to circular outlets having a diameter of about 0.46 mm, with the same centerline spanwise hole spacing or pitch of ten inlet diameters. The corresponding coverage value is 36%, which is an improvement over the simple cylindrical holes.

However, it is desired to further improve film cooling by more evenly diffusing the cooling film along the airfoil.

SUMMARY OF THE INVENTION

In accordance with one aspect of the invention, a turbine airfoil is provided having an external surface defining a leading edge and an axially spaced-part trailing edge. The leading edge has an axially-extending aerodynamic external surface curvature, a root and a tip spaced-apart along a radially-extending span axis, and a pressure sidewall and a laterally-spaced-apart suction sidewall. A cooling circuit is positioned between the pressure sidewall and the suction sidewall for channeling a fluid flow for cooling the airfoil. A plurality of cooling holes are formed in the external surface of the airfoil in fluid communication with the cooling circuit. Each of the plurality of cooling holes comprises a metering section downstream of the cooling circuit, and a diffuser section downstream of the metering section and upstream of the exit opening to the external surface of the airfoil. The diffuser section has a top wall, bottom wall and opposed side walls defining the exit opening on the external surface. At least the opposed side walls and one or the other of the top and bottom walls of the diffuser section has a downstream diverging, bell-shaped configuration for achieving a flow of the cooling film from the cooling circuit with enhanced spread, enhanced attachment and less turbulence to a downstream surface of the airfoil local to each respective cooling hole.

DESCRIPTION OF THE DRAWINGS

Further aspects of the invention will appear when taken in conjunction with the following drawings, in which.

DESCRIPTION OF THE PREFERRED EMBODIMENT AND BEST MODE

Figure 1:
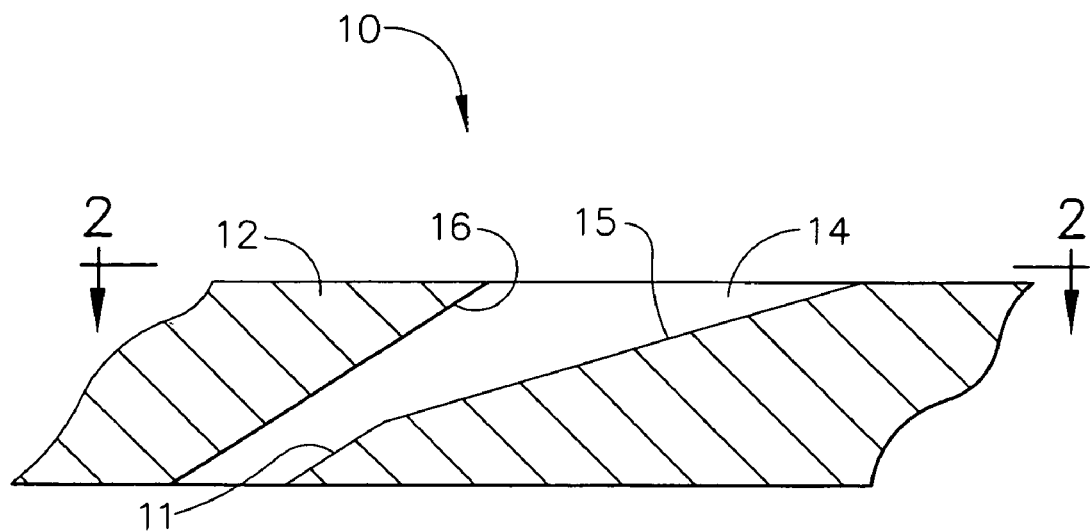
FIGS. 1 and 2 are vertical and horizontal cross-sections, respectively, of a typical prior art cooling hole.
Figure 2:
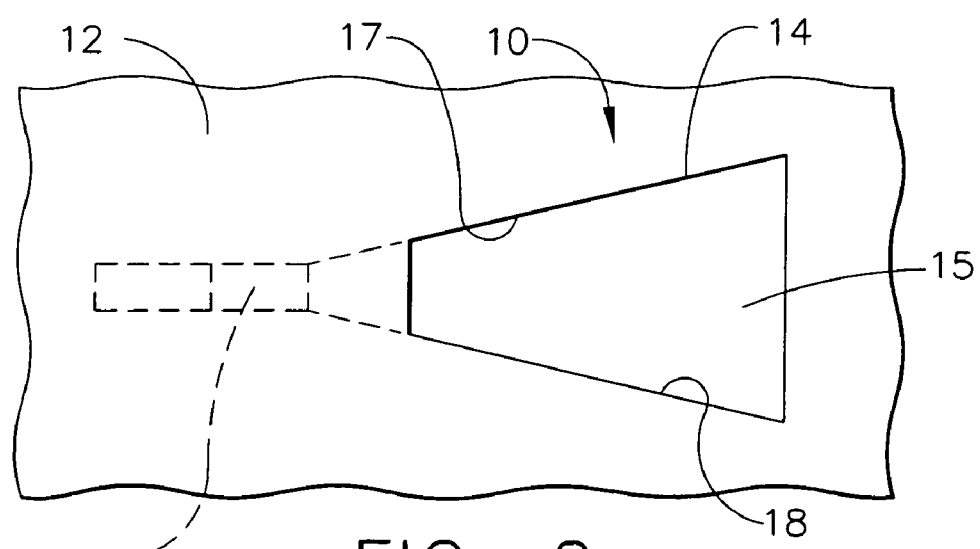
Figure 3:
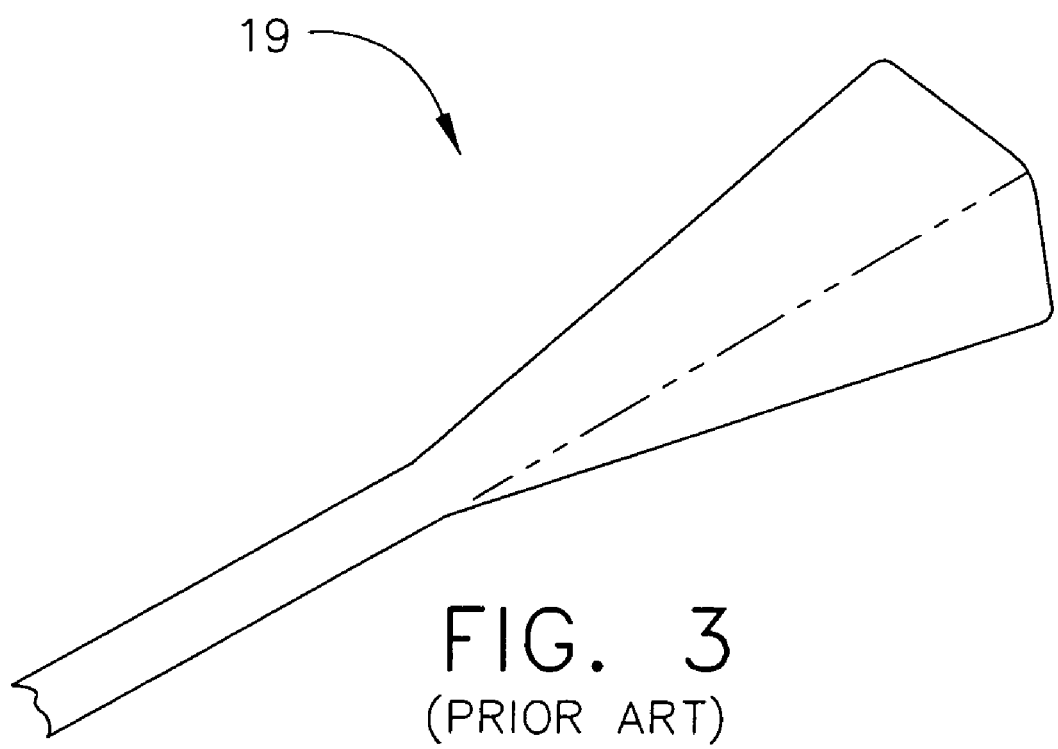
FIG. 3 is an EDM tool used for forming the cooling hole shown in FIGS. 1 and 2.

Referring now specifically to the drawings, FIGS. 1 and 2 illustrate a typical prior art cooling hole 10. The cooling hole 10 has a metering section 11 that communicates with a fluid circuit, not shown, in an airfoil 12. A diffuser section 14 communicates with the exterior surface of the airfoil 12. As shown in FIG. 1, the bottom wall 15 of the diffuser section 14 is straight as it diverges from the opposite, top wall 16, which is also straight. Similarly, as is shown in FIG. 2, the sidewalls 17 and 18 are likewise straight-sided as they diverge from the metering section 11 to the exterior surface of the airfoil 12. This is further illustrated in FIG. 3, where an Electrode Discharge Machining (EDM) tool 19 used to form the cooling hole 10 is shown.

Figure 4:
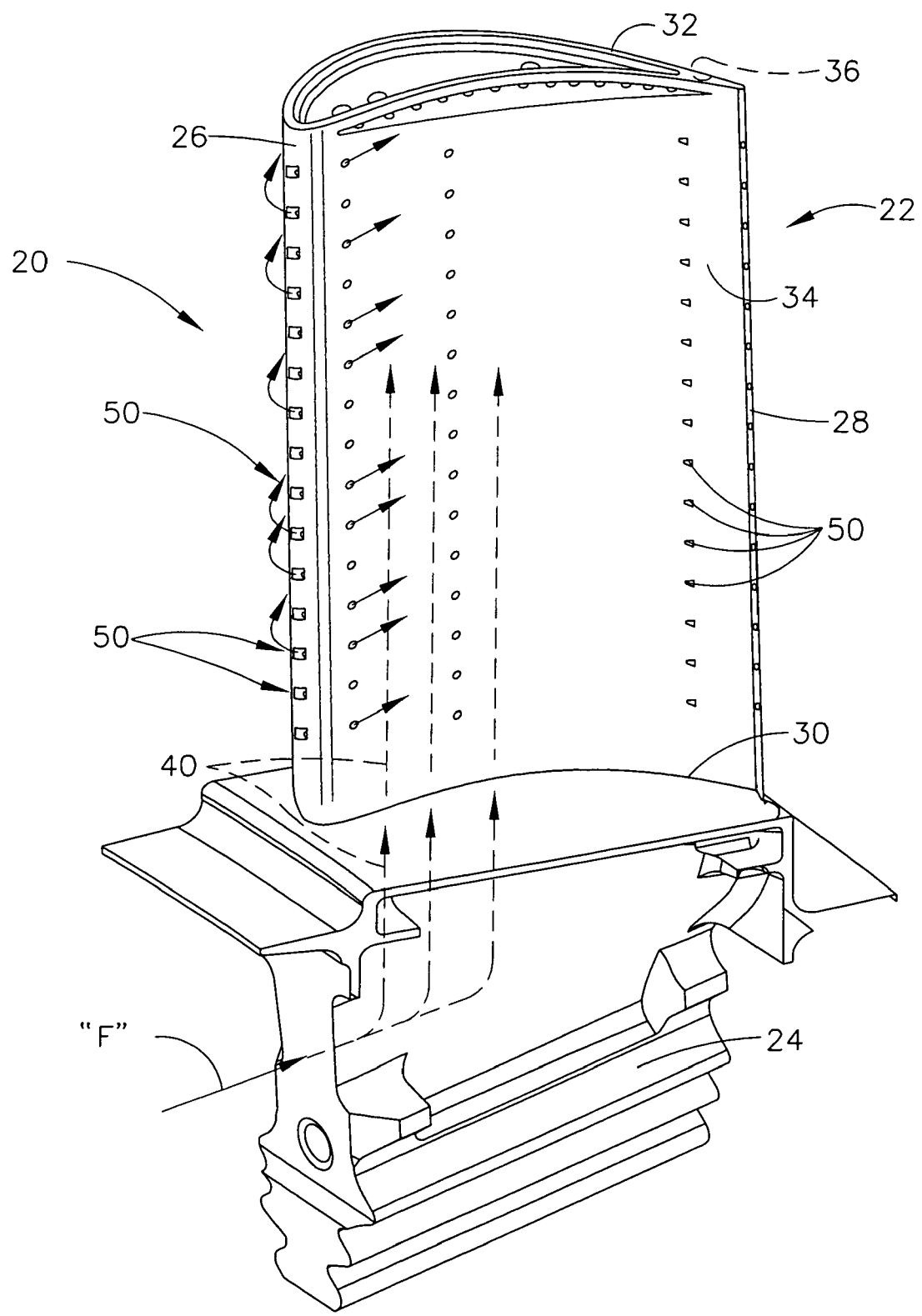
FIG. 4 is a perspective view of a gas turbine engine rotor blade including bell-shaped cooling holes on the leading edge area towards the suction side in accordance with an embodiment of the invention.

Referring now to FIG. 4, a turbine rotor blade 20 in accordance with an exemplary embodiment of the present invention is shown. The blade 20 includes an airfoil 22 having an integral dovetail 24 at a radially inner end for mounting the blade 20 to the perimeter of a rotor disk, not shown, in an annular row of such blades 20 in a conventional manner. In the exemplary embodiment illustrated in FIG. 4, the blade 20 is a first stage high pressure turbine rotor blade disposed immediately downstream of a high pressure turbine nozzle (not shown) which receives hot combustion gases from a combustor of a gas turbine engine (not shown) in a conventional manner. The airfoil 22 and dovetail 24 are suitably hollow for receiving a cooling fluid "F", such as a portion of compressed air bled from a compressor of the engine, for cooling the blade 20 during operation against the heat from the combustion gases.

The airfoil 22 includes a leading edge 26 and an opposite trailing edge 28. The airfoil 22 also includes a root 30 at a platform portion of the dovetail 24, and an opposite tip 32 spaced radially-apart along a generally radially-extending span axis.

The airfoil 22 also includes a pressure sidewall 34 that is generally concave and an opposite, suction sidewall 36 that is generally convex and is spaced-apart from the pressure sidewall 34. The pressure sidewall 34 and suction sidewall 36 extend from leading edge 26 to trailing edge 28, and root 30 to tip 32, respectively.

Airfoil 22 and the dovetail 24 include a cooling circuit 40 disposed between the airfoil sides 34 and 36 for channeling the cooling fluid "F" through the airfoil 22 for providing cooling during operation. The cooling circuit 40 may take any conventional form, including various channels extending through the airfoil 22, such as along the leading edge 26, along the trailing edge 28, and along the mid-chord area in the form of a suitable serpentine fluid path. In the airfoil 22 shown in FIG. 4, the cooling fluid "F" is channeled from the engine compressor and through suitable apertures between the dovetail 24 and its respective axial dovetail slot in the disk in any conventional manner.

Although the specific airfoil 22 is shown as a portion of the turbine rotor blade 20, the invention applies as well to any form of airfoil such as those also found in the stationary turbine nozzle (not shown).

In accordance with one exemplary embodiment of the present invention, a plurality of diffusion cooling holes 50 are spaced-apart along the suction side 36 of the leading edge 26 and the pressure side 34 of the trailing edge 28 in vertical rows for discharging the cooling fluid "F" from the cooling circuit 40 inside the airfoil 22 to provide a cooling film of fluid onto the surface of the suction side 36 of the leading edge 26 local to the holes. Note the direction of fluid flow aft of the leading edge and along the suction side 26 of the airfoil 22.

Figure 5:
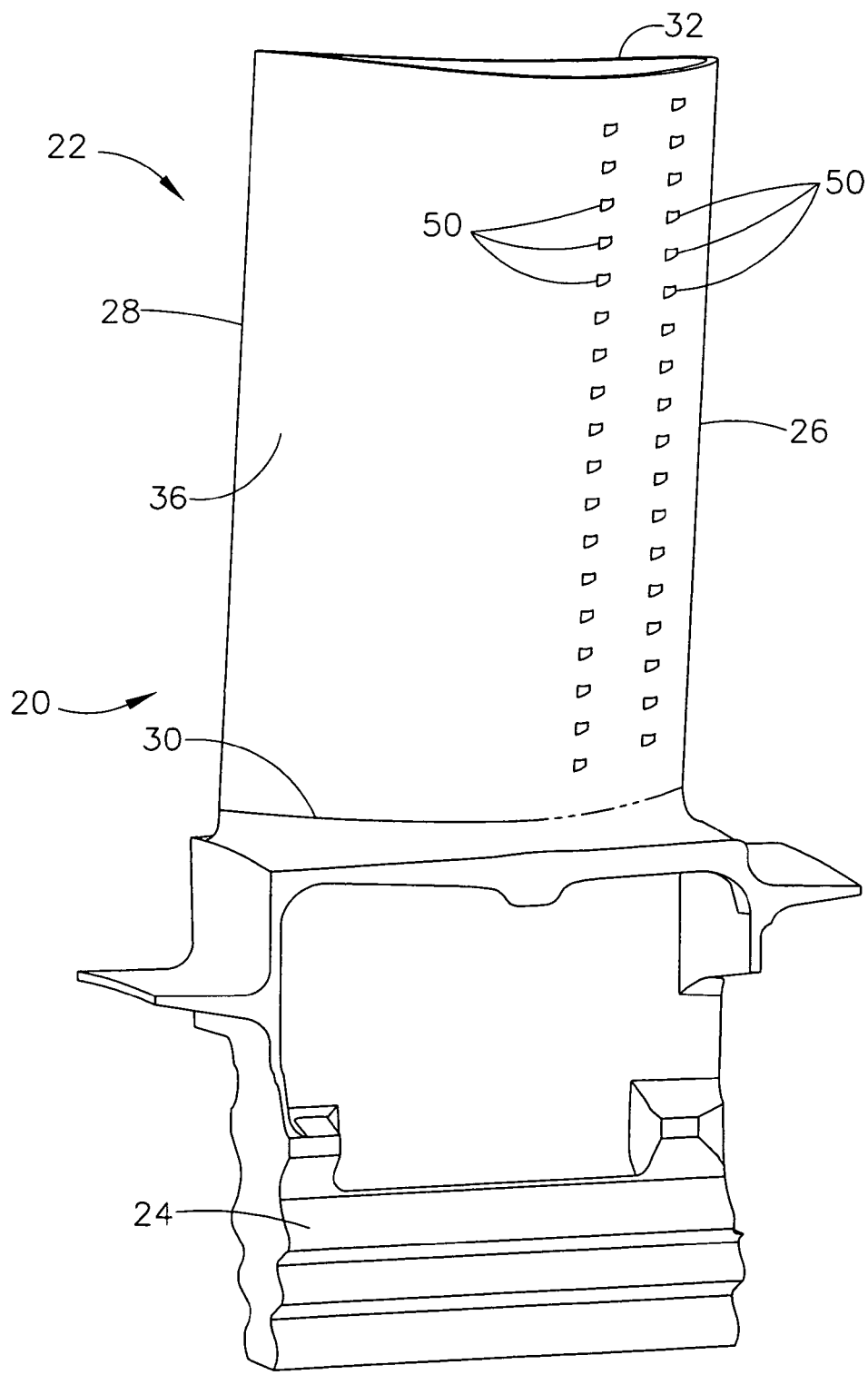
FIG. 5 is a perspective view of a gas turbine blade including bell-shaped cooling holes in the suction side in accordance with an embodiment of the invention.

As is shown in FIG. 5, the cooling holes 50 may also be formed in the leading edge 26 area of the suction side 36 of the airfoil 22.

Figure 6:
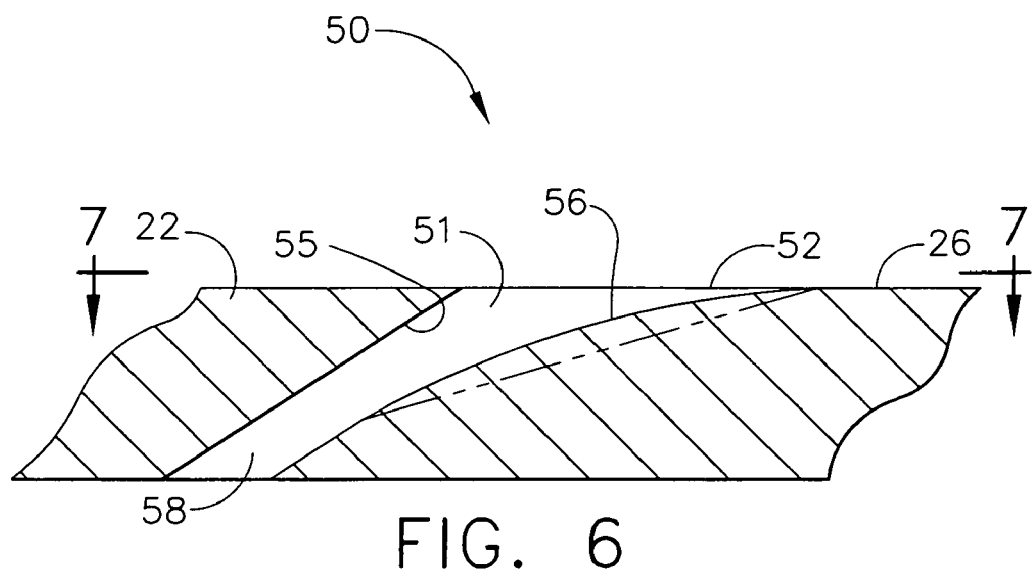
FIG. 6 is a vertical cross-section of a leading edge, bell-shaped cooling hole shown in FIG. 5.
Figure 7:
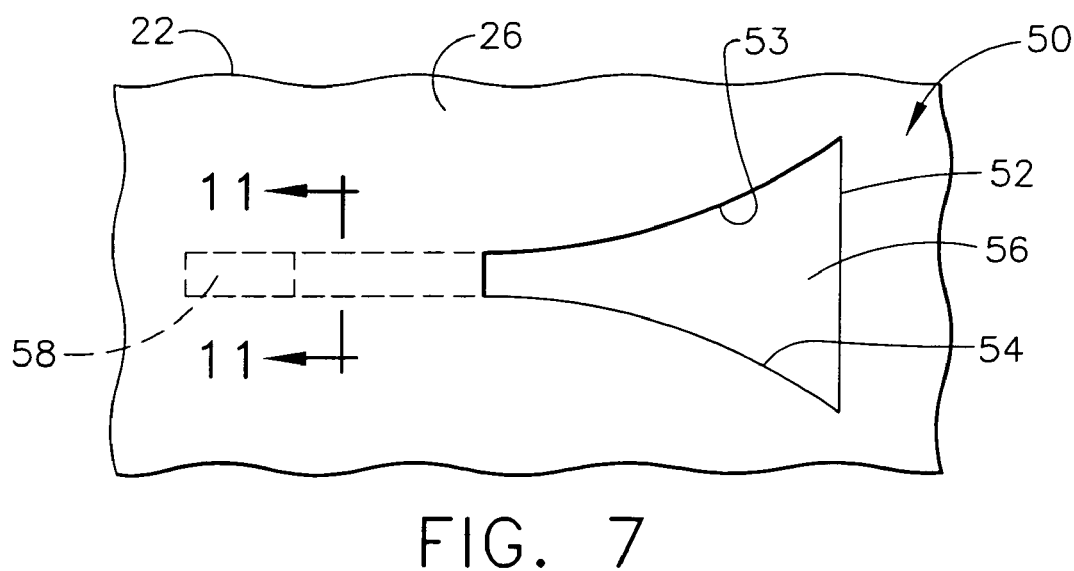
FIG. 7 is a horizontal cross-section taken along lines 6-6 of FIG. 6.

Referring now to FIGS. 6 and 7, each cooling hole 50 in the airfoil 22 includes a diffuser section 51. The diffuser section 51 has a generally quadralinear exit opening 52 on the surface of the airfoil 22 defined by opposed side walls 53, 54, FIG. 6, and opposed top and bottom walls 55, 56. Both of the side walls 53, 54 and the bottom wall 56 define outwardly diverging, bell-shaped curves that collectively more evenly disperse and spread the discharged air outwardly along the airfoil surface downstream of the cooling hole 50. Note that the term "bottom wall" refers to the wall 56 that exits the exit opening 52 of the airfoil 22 in essentially the same plane as the plane of the land portion of the airfoil 22 local to that particular cooling hole 50.

A metering section 58 is formed in the airfoil 22 upstream of the diffuser section 51 and communicates with the fluid circuit 40.

Cooling holes 50 in accordance with the present invention may, in a given application, also be formed in other locations on the airfoil 22 that are curved, and in particular designs the top side, or the top and bottom sides of a cooling hole may have a bell-shaped curvature.

Figure 8:
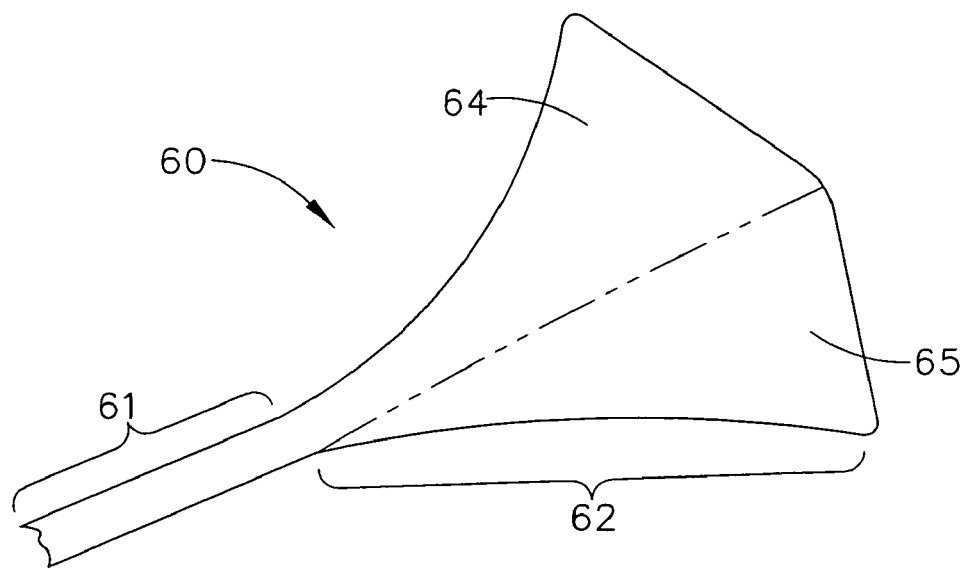
FIG. 8 is an EDM tool used to form the cooling hole shown in FIGS. 6 and 7.

The cooling holes may be formed by any conventional machining technique. One preferred method is by EDM using a tool 60 such as shown in FIG. 8. The EDM tool 60 has a metering section 61 and a diffuser section 62 corresponding to the metering section 58 and the diffuser section 51 to be formed in the airfoil 22. Note the curved walls 64, 65.

Figure 9:
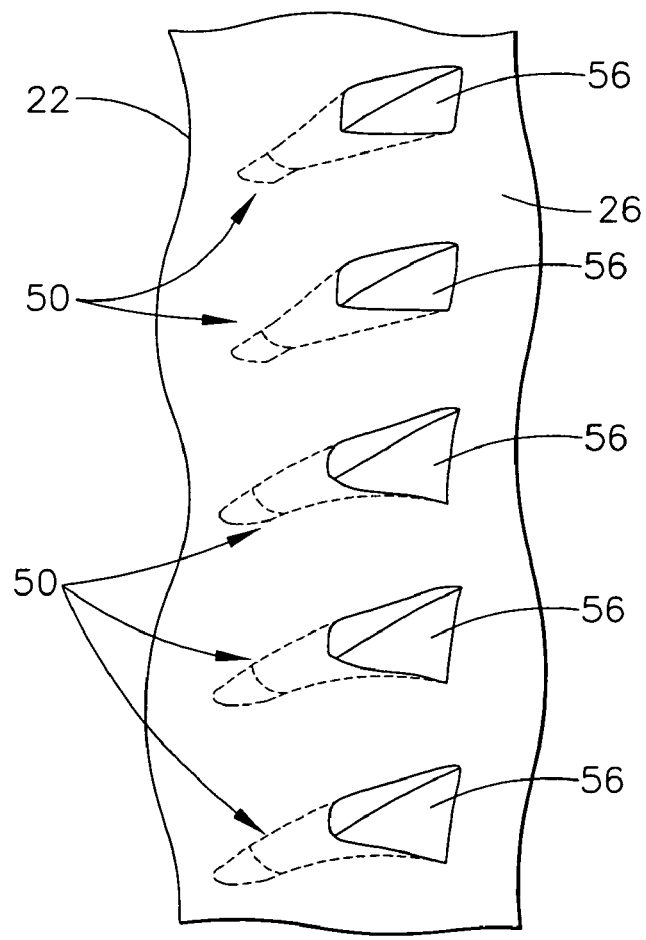
FIG. 9 is an enlarged view of an array of cooling holes on the airfoil shown in FIG. 5.
Figure 10:
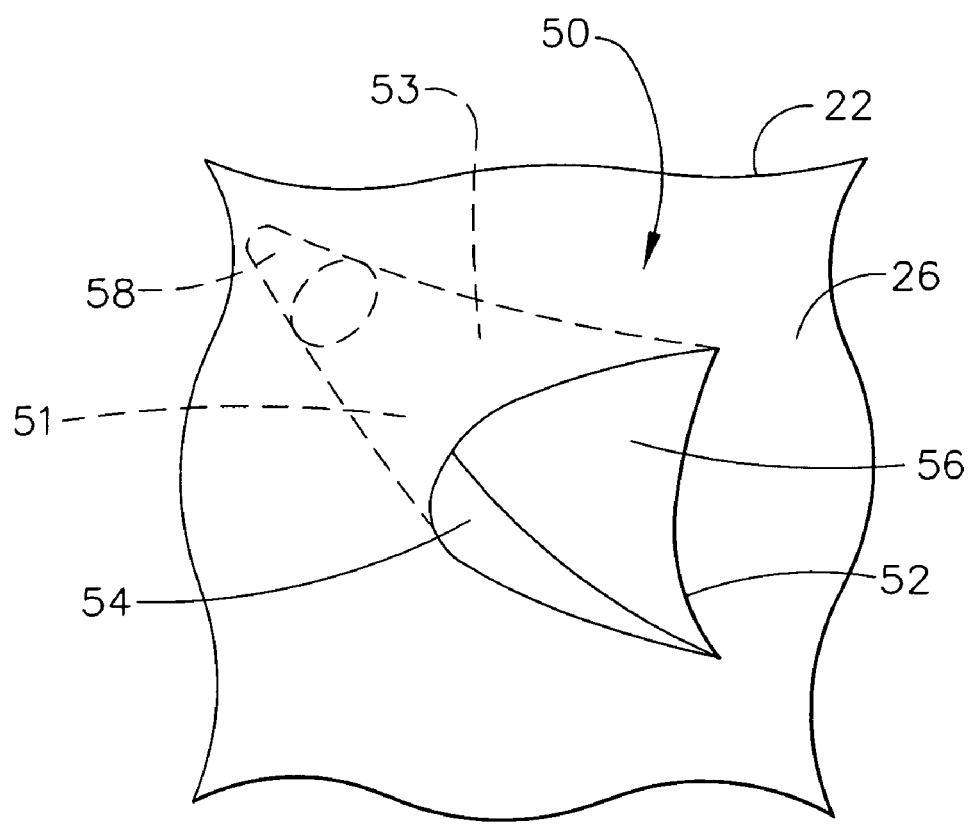
FIG. 10 is a further enlarged view of a single one of the cooling holes shown in FIG. 9.

Referring now to FIGS. 9 and 10, cooling holes 50 are generally shown, illustrating the bottom wall 56 that curves in a convex manner outwardly through the airfoil 22 to the exit opening 52, with the adjacent sidewalls 53, 54 doing likewise.

In one exemplary embodiment of the invention, the cooling holes 50 have an area of 0.45 mm² at the exit opening, and the metering section 58 has a diameter of 0.38 mm at its point of convergence with the diffuser section 51. The angle of divergence of the diffuser section 51 from the metering section 58 to the exit opening at the surface of the airfoil 22 is 15 degrees. The cooling holes 50 occupy approximately 35 percent of the surface area of the leading edge 26 and the distance between centerlines of vertically adjacent cooling holes 50 is approximately 1.14 mm. The distance between centerlines of laterally adjacent cooling holes 50 is 1.52 mm. Preferably, the exit openings 52 are spaced vertically apart by about 0.76 mm and are spaced laterally apart by about 0.76 mm.

The curvature of each of the diffuser sidewalls 53, 54 is preferably between 10 and 30 degrees of arc of a circle defined by the sidewalls 53, 54, and most preferably about 20 degrees of arc. The curvature of the bottom diffuser wall 56 is within the range of 10-30 degrees of arc, and most preferably about 20 degrees of arc. In one preferred embodiment, the circle defined by the curved sidewalls 53, 54 has a radius of 5 mm, and the circle defined by the curve of the bottom wall 56 has a radius of 7.1 mm. The dimensions are variable and relate particularly to aircraft engine airfoils. The dimensions for large power generation turbine airfoils would typically be several times larger.

Figure 11:
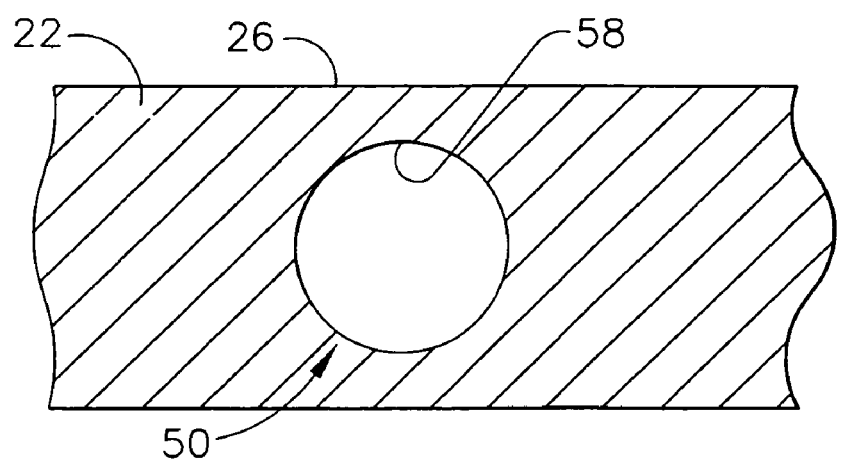
FIG. 11 is a vertical cross-section taken along line 10-10 of FIG. 7, showing a circular-shaped metering section.

Referring now to FIG. 11, the metering section 58 of cooling hole 50 is circular in cross-section, and preferably has a constant diameter. In a preferred embodiment the diameter of the metering section is 0.36 mm.

Figure 12:
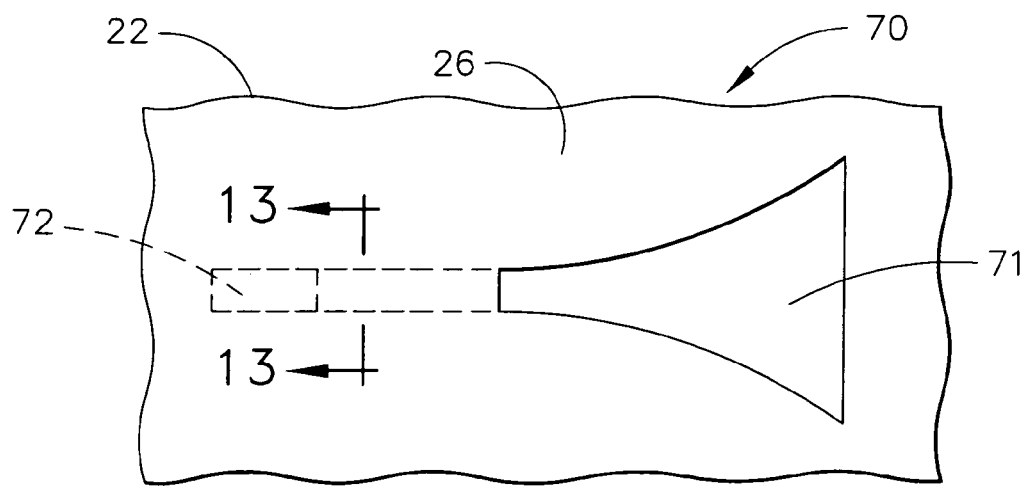
FIG. 12 is a horizontal cross-section showing of a bell-shaped cooling hole according to an alternate embodiment of the invention.
Figure 13:
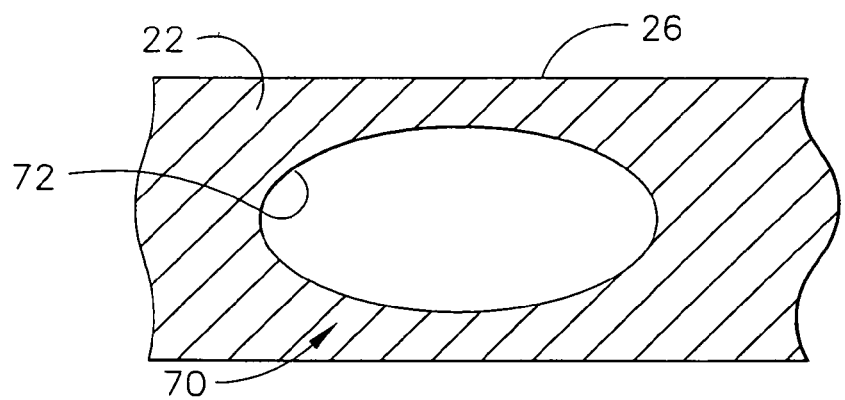
FIG. 13 is a vertical cross-section taken along lines 13-13 of FIG. 11 showing an oval-shaped metering section.

As is shown in FIGS. 12 and 13, a cooling hole 70 according to an alternative embodiment has a diffuser section 71 and a metering section 72. The metering section 72 is oval in cross-section, with the long axis of the oval being oriented in the widthwise direction between opposing side walls.

Figure 14:
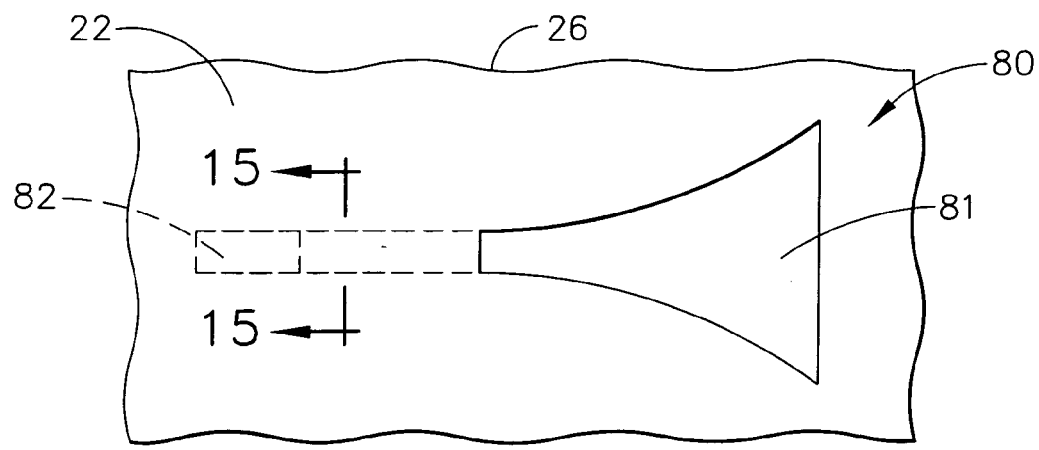
FIG. 14 is a horizontal cross-section showing of a bell-shaped cooling hole according to a further alternate embodiment of the invention.
Figure 15:
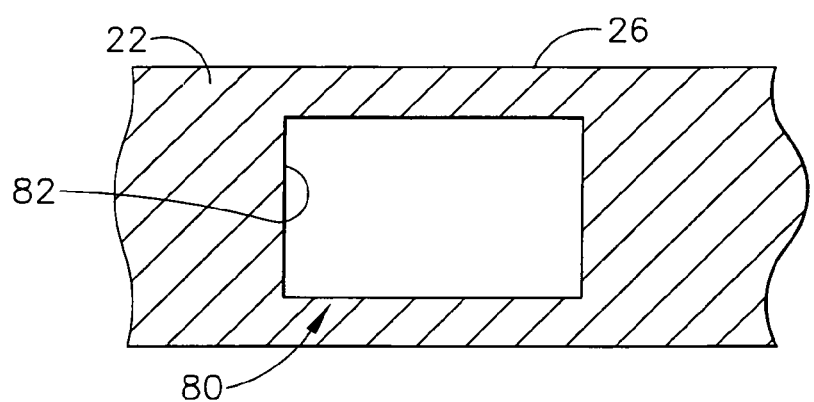
FIG. 15 is a vertical cross-section taken along line 15-15 of FIG. 13 showing an oval shape of the metering section of the cooling hole.

Similarly, FIGS. 14 and 15 illustrate a further alternative cooling hole 80 having a diffuser section 81 and a metering section 82. The metering section is rectangular in cross-section, with the long axis of the rectangle being oriented in the widthwise direction between opposing side walls.

An airfoil with bell-shaped cooling holes for enhanced cooling is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A turbine airfoil having an external surface defining a curvature, comprising:
   (a) a leading edge and an axially spaced-apart trailing edge, the leading edge having an axially-extending aerodynamic external surface curvature;
   (b) a root and a tip spaced-apart along a radially-extending span axis;
   (c) a pressure sidewall and a laterally-spaced-apart suction sidewall;
   (d) a cooling circuit positioned between the pressure sidewall and the suction sidewall for channeling a fluid flow for cooling the airfoil;
   (e) a plurality of cooling holes formed in the external surface of the airfoil in fluid communication with the cooling circuit, at least some of the plurality of cooling holes comprising:
      (i) a metering section downstream of the cooling circuit;
      (ii) a diffuser section downstream of the metering section and upstream of the external surface of the airfoil, the diffuser section having at least a bottom wall and opposed side walls defining an exit opening on the external surface for exiting a cooling film, the bottom wall having a downstream diverging, non-planar surface extending between the opposed side walls that defines a convex curvature in the direction of the span axis at the exit opening.

2. A turbine airfoil according to claim 1, wherein the metering section has a uniform cross-section normal to the direction of fluid flow through the metering section.

3. A turbine airfoil according to claim 1, wherein the metering section has a uniform cross-section normal to the direction of fluid flow through the metering section and selected from the group consisting of circular, oval and rectangular.

4. A turbine airfoil according to claim 1, wherein the cooling holes are formed in the suction sidewall of the airfoil.

5. A turbine airfoil according to claim 1, wherein the exit opening of the diffuser section defines a radially-extending vertical height dimension and a laterally-extending width dimension.

6. A turbine airfoil according to claim 1, wherein the bottom wall of the diffuser section defines an angle of between 0 and 30 degrees relative to the metering section.

7. A turbine airfoil according to claim 1, wherein the surface area coverage of the leading edge by the cooling holes is about 35 percent.

8. A turbine airfoil according to claim 1, wherein the area of each exit opening is between about 0.12 mm² and about 0.65 mm².

9. A turbine airfoil according to claim 1, wherein the area of the exit opening is about 0.45 mm².

10. A turbine airfoil according to claim 1, wherein the airfoil comprises a turbine blade.

11. A turbine airfoil having an external surface defining a curvature, comprising:
   (a) a leading edge and an axially spaced-apart trailing edge, the leading edge having an axially-extending aerodynamic external surface curvature;
   (b) a root and a tip spaced-apart along a radially-extending span axis;
   (c) a pressure sidewall and a laterally-spaced-apart suction sidewall;
   (d) a cooling circuit positioned between the pressure sidewall and the suction sidewall for channeling a fluid flow for cooling the airfoil;
   (e) a plurality of cooling holes formed in the external surface of the airfoil in fluid communication with the cooling circuit, each of the plurality of cooling holes comprising:
      (i) a metering section downstream of the cooling circuit;
      (ii) a diffuser section downstream of the metering section and upstream of the external surface of the airfoil, the diffuser section having at least a bottom wall and opposed side walls defining an exit opening on the external surface for exiting a cooling film; and (f) wherein the bottom wall of the diffuser section defines a non-planar, convex, curved surface extending between the side walls in the direction of the span axis at the exit opening for achieving a flow of the cooling film from the cooling circuit with enhanced spread, enhanced attachment and less turbulence to the external surface of the airfoil local to each respective cooling hole.

12. A turbine airfoil according to claim 11, wherein the airfoil comprises a turbine blade.

13. A turbine airfoil according to claim 11, wherein the curvature of the side walls of the diffuser section is between 10 and 30 degrees of arc of a circle defined by the side walls, and the curvature of the bottom wall of the diffuser section is between 10 and 30 degrees of arc of a circle defined by the bottom wall.

14. A turbine airfoil according to claim 13, wherein the circle defined by the side walls has a radius of 5 mm, and the circle defined by the bottom wall has a radius of 7.1 mm.

15. A turbine airfoil having an external surface defining a curvature, comprising:
  (a) a leading edge and an axially spaced-apart trailing edge, the leading edge having an axially-extending aerodynamic external surface curvature;
  (b) a root and a tip spaced-apart along a radially-extending span axis;
  (c) a pressure sidewall and a laterally-spaced-apart suction sidewall;
  (d) a cooling circuit positioned between the pressure sidewall and the suction sidewall for channeling a fluid flow for cooling the airfoil;
  (e) a plurality of cooling holes formed in the external surface of the airfoil in fluid communication with the cooling circuit, each of the plurality of cooling holes comprising:
    (i) a metering section downstream of the cooling circuit;
    (ii) a diffuser section downstream of the metering section and upstream of the external surface of the airfoil, the diffuser section having at least a bottom wall and opposed side walls defining an exit opening on the external surface for exiting a cooling film; and
  (f) wherein the bottom wall of the diffuser section has a downstream diverging, convex, curved, non-planar configuration extending between the side walls in the direction of the span axis at the exit opening, and wherein the curvature of the bottom wall is between 10 and 30 degrees of arc of a circle defined by the bottom wall.

16. A turbine airfoil according to claim 15, wherein the curvature of the bottom wall is 20 degrees of arc of a circle defined by the bottom wall.

* * * * *